S. Scholfield.
Life Preserver.
Nº 39,175.   Patented Jul. 7, 1863.
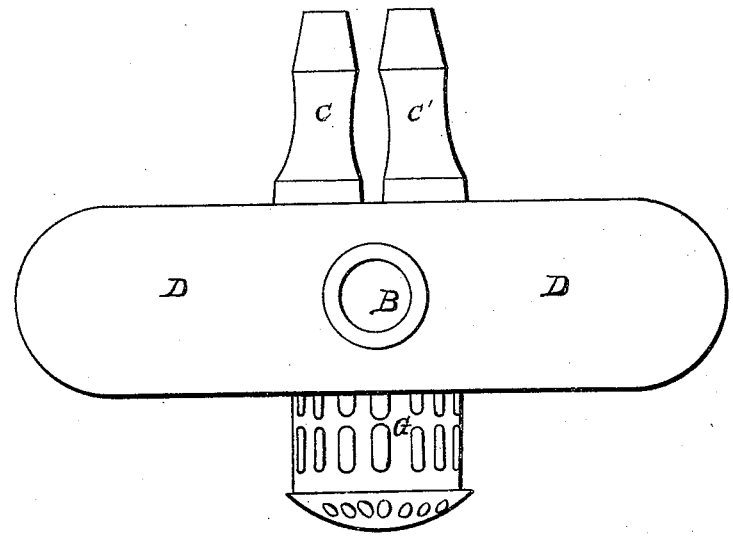
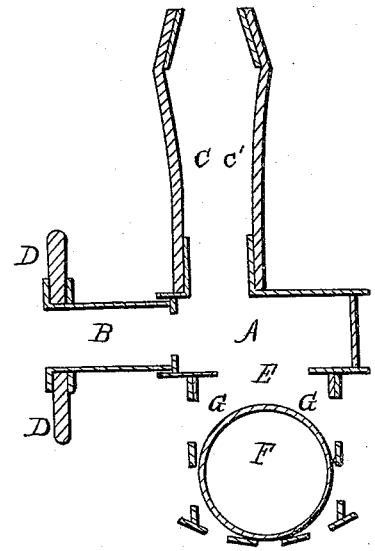
Witnesses
C. N. Schofield
M. Schofield.
Inventor,
Socrates Schofield.

UNITED STATES PATENT OFFICE.

SOCRATES SCHOLFIELD, OF NORWICH, CONNECTICUT.

IMPROVED LIFE-PRESERVER.

Specification forming part of Letters Patent No. 39,175, dated July 7, 1863.

*To all whom it may concern:*

Be it known that I, SOCRATES SCHOLFIELD, of Norwich, in the county of New London and State of Connecticut, have invented a new and Improved Apparatus to be used as a Life-Preserver; and I do hereby declare that the following is a full and exact description, reference being had to the accompanying drawings, making a part of this specification.

The nature of my invention consists in combining a suitable breathing apparatus with a floating valve, so that when the person wearing the same endeavors to pass through the breakers or surf it becomes impossible for him to inhale the water, thus avoiding strangulation and consequent drowning.

To enable those skilled in the art to make and use my invention, I will proceed to describe its construction and operation.

The apparatus may consist of a chamber, A, into which the three pipes B C C' enter. The pipe B is furnished with a flange, D, to be held in the mouth between the teeth and lips, and which, in connection with a strap outside of the lips, will secure the whole apparatus firmly. The pipes C C' are to be attached to the nose or nostrils, so as to secure a water-tight joint. The bottom of the chamber A, into which these pipes enter, has an orifice, E, opening into the perforated chamber, G. This chamber contains the floating valve F, which operates to close the orifice E, preventing the ingress of water.

As long as the head of the person wearing this apparatus is above the surface of the water, the orifice E will remain open, allowing him to breathe through the pipes B C C' at pleasure; but whenever he is covered by the breakers or surf, the water passing freely into the perforated chamber G raises the valve F, thus closing the orifice E, which will remain so closed until his head rises out of the water, when he can breathe freely, as before.

The pipe B may be so constructed that the air in passing through it may make a noise like a whistle, thereby increasing the efficiency of the apparatus.

The valve F may be made of india-rubber in the form of a hollow ball, to float on the surface of the water within the perforated chamber G, or an equivalent valve made of any substance, so as to be lighter than water, in order that it may float upward and close the orifice E at the proper time, may be used.

What I claim as my invention, and desire to secure by Letters Patent, is—

1. The combination of a floating valve, F, with the pipe B or its equivalent, substantially as described.

2. The combination of a floating valve, F, with the pipes C C' or their equivalent, substantially as described.

SOCRATES SCHOLFIELD.

Witnesses:
  B. F. SCHOLFIELD,
  CYRUS N. SCHOLFIELD.